(12) United States Patent
Otohata et al.

(10) Patent No.: US 7,931,982 B2
(45) Date of Patent: Apr. 26, 2011

(54) BATTERY WITH LAMINATED FILM COVERING AND FABRICATION METHOD

(75) Inventors: Makihiro Otohata, Sagamihara (JP); Hiroshi Yageta, Sagamihara (JP)

(73) Assignee: NEC Corporation, Tokyo (JP)

( * ) Notice: Subject to any disclaimer, the term of this patent is extended or adjusted under 35 U.S.C. 154(b) by 1000 days.

(21) Appl. No.: 10/566,713

(22) PCT Filed: Jul. 29, 2004

(86) PCT No.: PCT/JP2004/010796
§ 371 (c)(1),
(2), (4) Date: Feb. 1, 2006

(87) PCT Pub. No.: WO2005/015659
PCT Pub. Date: Feb. 17, 2005

(65) Prior Publication Data
US 2006/0194103 A1   Aug. 31, 2006

(30) Foreign Application Priority Data
Aug. 8, 2003  (JP) .................................. 2003-290465

(51) Int. Cl.
*H01M 2/08* (2006.01)
(52) U.S. Cl. .................... 429/185; 429/162; 429/163
(58) Field of Classification Search .................. 429/162, 429/163, 185
See application file for complete search history.

(56) References Cited

U.S. PATENT DOCUMENTS
6,503,656 B1 * 1/2003 Bannai et al. .................. 429/162

FOREIGN PATENT DOCUMENTS
| | | |
|---|---|---|
| EP | 1047137 A2 | 10/2000 |
| EP | 1063713 A2 | 12/2000 |
| JP | 2001-6633 A | 1/2001 |
| JP | 2001-52663 A | 2/2001 |
| JP | 2001-126678 A | 5/2001 |
| JP | 2001-319630 A | 11/2001 |
| JP | 2002-151023 A | 5/2002 |
| JP | 2003-100266 A | 4/2003 |
| WO | WO0156097 A1 * | 1/2000 |

* cited by examiner

*Primary Examiner* — Dah-Wei D Yuan
*Assistant Examiner* — Zachary Best
(74) *Attorney, Agent, or Firm* — Sughrue Mion, PLLC

(57) ABSTRACT

A film-covered battery 1 includes battery element 6 and laminate films 3 and 4 for sealing battery element 6. Laminate films 3 and 4 are realized by laminating a heat-seal resin layer and a metal foil layer and seal battery element 6 by arranging the films on either side of battery element 6 with the heat-seal resin layers disposed on the inside and then heat-sealing at sealing areas 3a and 4a on the outer peripheries of the films. The areas of the laminate films 3 and 4 other than sealing areas 3a and 4a are electron beam irradiation areas 3b and 4b that are irradiated by an electron beam. Cross-linked structures are formed in the heat-seal resin layers of electron beam irradiation areas 3b and 4b by irradiation by an electron beam.

16 Claims, 11 Drawing Sheets

BATTERY WITH LAMINATED FILM COVERING AND FABRICATION METHOD

This application claims priority from PCT Application No. PCT/JP2004/010796 filed Jul. 29, 2004 and from Japanese Application No. 2003-290465 filed Aug. 8, 2003, which applications are incorporated herein by reference.

TECHNICAL FIELD

The present invention relates to a film-covered battery in which a battery element is incorporated in an outer covering composed of film, and to a method for fabricating the film-covered battery.

BACKGROUND ART

Recent years have witnessed a strong demand for lighter and thinner batteries as the power supplies of, for example, portable devices. The covering material of batteries has also come to employ materials such as metal foil and laminate films in which a metal foil and heat-seal resin film are laminated, and these films enable both lighter and thinner structures and greater freedom in the shapes that are adopted.

A three-layer laminate film can be taken as a representative example of a laminate film that is used as the outer covering of a battery, this laminate film being formed by laminating heat-seal resin film, which is a heat-seal layer, on one side of an aluminum thin-film, which is the metal foil, and then laminating a protective film on the other surface.

As shown in FIG. 1, in a film-covered battery that uses a laminate film as the covering material, battery element 106, which is composed of positive electrodes, negative electrodes, and an electrolyte, is typically interposed between two laminate films 103 and 104 in which the heat-seal resin films confront each other, following which laminate films 103 and 104 are heat-sealed around the periphery of battery element 106 (the area indicated by diagonal lines in the figure) to hermetically seal (hereinafter referred to as simply "seal") battery element 106.

Protruding tabs are provided on each of the positive electrodes and negative electrodes to lead out from the positive electrodes and negative electrodes of battery element 106, and collectors 107a and 107b, in which the tabs are collected for each electrode, are in turn connected to lead terminals 105a and 105b, respectively, that extend out from laminate films 103 and 104. In addition, at least one of laminate films 103 and 104 is formed as a flanged receptacle by deep-drawing so as to facilitate the accommodation of battery element 106.

The heat-sealing of the laminate films is carried out by applying pressure and heat to laminate films 103 and 104 by means of a pair of heat-seal heads 109a and 109b, as shown in FIG. 2.

At this time, the heat that is applied by heat-seal heads 109a and 109b is also conveyed to the area surrounding the points of laminate films 103 and 104 that are to be heat-sealed, with the result that heat-seal resin 103d and 104d is melted in areas in which heat-sealing is not required. When heat-seal resin 103d and 104d is melted in portions A and B that contact battery element 106, battery element 106 contacts metal foil 103e and 104e of laminate films 103 and 104, raising the concern for short-circuits between these two surfaces.

In JP-A-2001-126678, a battery is disclosed that is directed to the prevention of short-circuiting by arranging a heat-seal resin film of the same material as the heat-seal resin at the points of the laminate films that are heat-sealed and the vicinities of these points to substantially increase the thickness of the layers of heat-seal resin at points susceptible to short-circuiting.

On the other hand, JP-A-2001-6633 discloses a technology for improving the heat resistance of the laminate films according to which the battery element is sealed in a laminate film, following which the areas of the laminate films that have undergone heat-sealing are subjected to irradiation by an electron beam to form cross-linked structures in the heat-seal resin and thus improve the reliability of sealing.

However, the technique that is disclosed in JP-A-2001-126678 involves nothing more than increasing the thickness of portions of the heat-seal resin layer, and brings about no particular change regarding the melting of heat-seal resin in areas susceptible to short-circuiting that are in the vicinities of points that are heat-sealed when sealing the battery element. Accordingly, if heat-seal conditions are not appropriately set according to the thickness of the layer of the heat-seal resin, either adequate heat-sealing may not be achieved, or conversely, excessive melting of the heat-seal resin may occur, resulting in the occurrence of short-circuiting with the metal foil. Further, when using laminate film that has undergone deep drawing to form an area in which the battery element is to be accommodated, the portion of the laminate film that contacts the battery element is usually the portion of the laminate film that has undergone deep drawing. As a result, in spite of the arrangement of heat-seal resin film for preventing short-circuits, the thickness of the layer of heat-seal resin has already been reduced by the deep-drawing process and the arrangement of resin therefore does not obtain the anticipated effect.

Although JP-A-2001-6633 discloses an improvement of the heat resistance of the heat-seal resin of the laminate film, this technique is directed towards improving the reliability of sealing in heat-sealed areas following heat sealing and not to the prevention of short-circuits between the battery element and the metal foil that occur during sealing.

DISCLOSURE OF THE INVENTION

It is an object of the present invention to provide: a film-covered battery that can prevent short-circuits between the battery element and metal foil that occur when sealing a battery element within laminate films composed of heat-seal resin layers and a metal foil layers due to melting of the heat-seal resin film at points of contact with the battery element that are caused by the heat applied at the time of heat-sealing; and to provide a fabrication method for such a battery.

The film-covered battery of the present invention for attaining the above-described object includes: a battery element having a configuration in which a positive electrode confront a negative electrode; and a laminate film, in which at least a heat-seal resin layer and a metal foil layer are laminated, for encapsulating the battery element with the heat-seal resin layer arranged on an inner side and for sealing the battery element by heat-sealing an outer periphery of the laminate film; wherein a cross-linked structure is formed in the heat-seal resin layer of the laminate film in at least an area in which the heat-seal resin reaches a temperature equal to or greater than the melting point at the time of heat sealing the laminate film with the exception of an outer periphery of a heat-sealed area and in which the laminate film contacts a part that is sealed inside the laminate film.

In the film-covered battery of the present invention, the cross-linked structure is formed in the heat-seal resin layer of the laminate film in the area in which the laminate film attains a temperature equal to or greater than the melting point at the time of heat sealing and in which the laminate film contacts with the part that is sealed inside. The heat resistance in the area in which the cross-linked structure is formed is therefore improved with respect to other areas, and as a result, the heat-seal resin layer is not melted by heat at the time of heat sealing, and short-circuits between the battery element and the metal foil layer are thus prevented. Further, because cross-linked structure is not formed in the outer periphery of the area that is heat-sealed, the laminate film is securely heat-sealed in area in which cross-linked structure is not formed and the battery element is therefore reliably sealed.

The cross-linked structure can be formed by irradiating the laminate film by an electron beam. In this case, the heat-seal resin layer may be a material that contains polyolefin, or may be a material in which an electron beam-reactive compound is added to a resin that is degraded by electron beams.

The fabrication method of a film-covered battery of the present invention is a fabrication method of a film-covered battery in which a battery element having a configuration in which a positive electrode confront a negative electrode is encapsulated in laminate film in which at least a heat-seal resin layer and a metal foil layer are laminated and sealed by heat sealing of the periphery of the laminate film. The fabrication method includes steps of: forming a cross-linked structure in the heat-seal resin layer in at least the area of the laminate film in which the heat-seal resin layer reach a temperature equal to or greater than the melting point at the time of heat-sealing the laminate films with the exception of the outer periphery of the area that is heat-sealed and in which the laminate film contact a part that is sealed; encapsulating the battery element in the laminate film in which the cross-linked structure has been formed in the heat-seal resin layer with the heat-seal resin layer as the inner surface; and heat-sealing the outer periphery of the laminate film that encapsulates the battery element to seal the battery element.

According to the fabrication method of the film-covered battery of the present invention, the cross-linked structure is formed only in specific area of the heat-seal resin of the laminate film, following which the laminate film is heat-sealed to seal the battery element, and as a result, as previously described, the sealing of the battery element by heat sealing of the laminate film can be performed reliably, and short-circuits between the battery element and metal foil layer at the time of heat-sealing the laminate film are prevented.

In the fabrication method of a film-covered battery according to the present invention, the step for forming the cross-linked structure preferably includes a step for masking an area of the laminate film in which the cross-linked structure is not to be formed and a step for irradiating the masked laminate film with an electron beam. This provision facilitates the selective formation of the cross-linked structure on the laminate film. The irradiation by electron beam is carried out before encapsulating the battery element in the laminate film, and the irradiation by the electron beam therefore does not cause a reduction in battery performance.

According to the present invention, a film-covered battery having high reliability can be obtained because short-circuiting does not occur between the battery element and metal foil at the time of heat sealing of the laminate film, and moreover, the heat-seal resin layer retain its natural property in area that is to be heat-sealed and suffer no reduction in heat-sealing ability, i.e., the ability to seal the battery element.

BEST MODE FOR CARRYING OUT THE INVENTION

The following explanation regards an embodiment of the present invention with reference to the accompanying figures.

Figure 1:
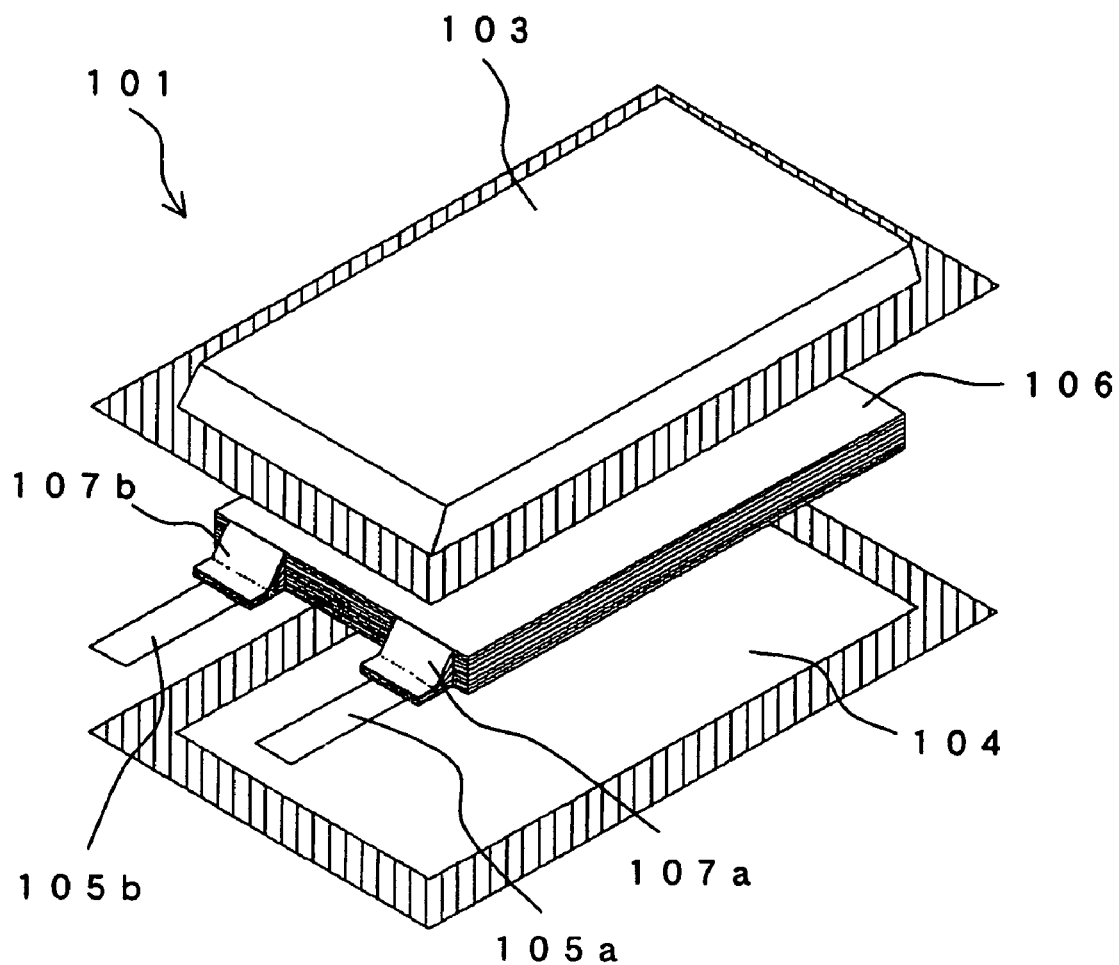
[FIG. 1]
An exploded perspective view of a film-covered battery of the prior art.
Figure 2:
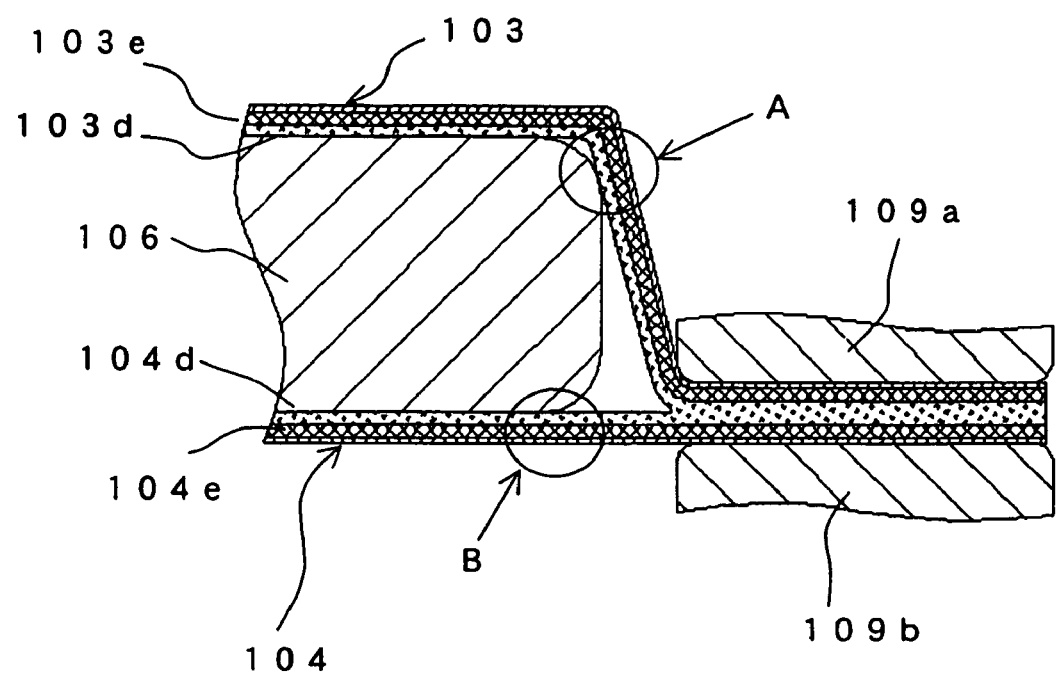
[FIG. 2]
A sectional view of the vicinity of a sealing area of the laminate film at the time of heat-sealing in the film-covered battery that is shown in FIG. 1.
Figure 3:
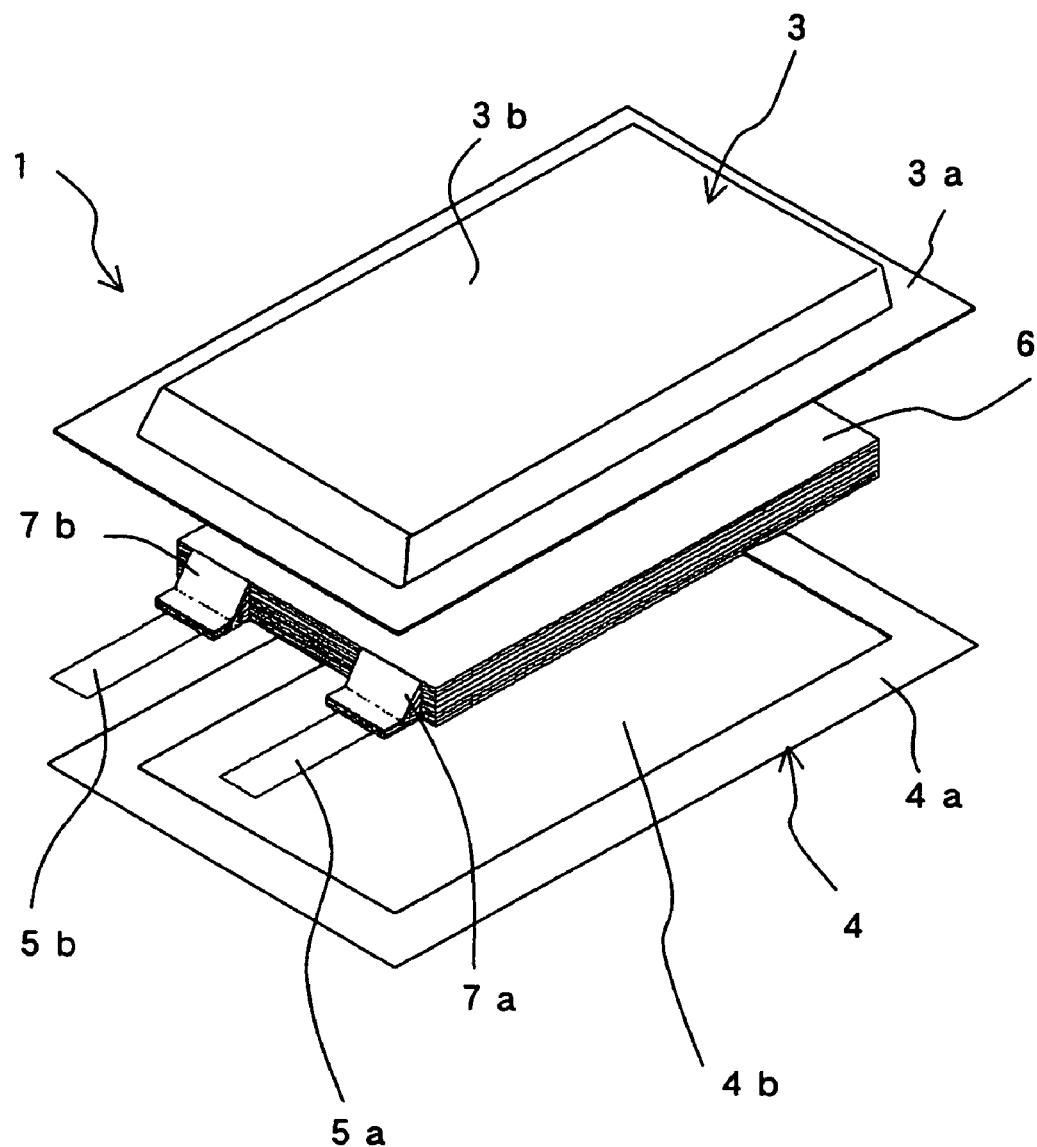
[FIG. 3]
An exploded perspective view of a film-covered battery according to an embodiment of the present invention.

Referring to FIG. 3, an exploded view is shown of film-covered battery 1 according to an embodiment of the present invention. Film-covered battery 1 according to the present embodiment includes: battery element 6, positive electrode collector 7a and negative electrode collector 7b that are provided in battery element 6; an outer case for accommodating battery element 6 together with an electrolyte; positive electrode lead terminal 5a that is connected to positive electrode collector 7a; and negative electrode lead terminal 5b that is connected to negative electrode collector 7b.

Battery element 6 is made up from a plurality of positive electrode plates and a plurality of negative electrode plates, each of which is applied with an electrode material, that are alternately laminated with separators interposed. Each positive electrode plate and each negative electrode plate is provided with a portion that protrudes from one side that is not applied by the electrode material, and the non-applied portions of the positive electrode plates and the uncovered portions of the negative electrode plates are collectively subjected to ultrasonic welding to form positive electrode collector 7a and negative electrode collector 7b, respectively. The connection of positive electrode lead terminal 5a to positive electrode collector 7a and the connection of negative electrode lead terminal to negative electrode collector 7b is preferably carried out as the same time as the formation of positive electrode collector 7a and negative electrode collector 7b for simplifying the fabrication process, but this connection may also be realized in a separate step.

The outer case is composed of two laminate films 3 and 4 that encapsulate battery element 6 from above and below battery element 6 in the direction of thickness of battery element 6, and heat-sealing the outer peripheries of these laminate films 3 and 4 hermetically seals battery element 6. One laminate film 3 is processed into the shape of a cup with a flange to form a depression as seen from the side of battery element 6 and thus form a chamber for accommodating battery element 6 in one laminate film 3. This depression can be formed by, for example, deep drawing. In the example shown in FIG. 3, a depression is formed in one laminate film 3, but a depression may also be formed in the other laminate film 4. In addition, depending on the thickness of battery element, depressions may be formed in both laminate films 3 and 4, or, taking advantage of the flexibility of laminate films 3 and 4, battery element 6 may be sealed without forming any depressions.

Figure 4:
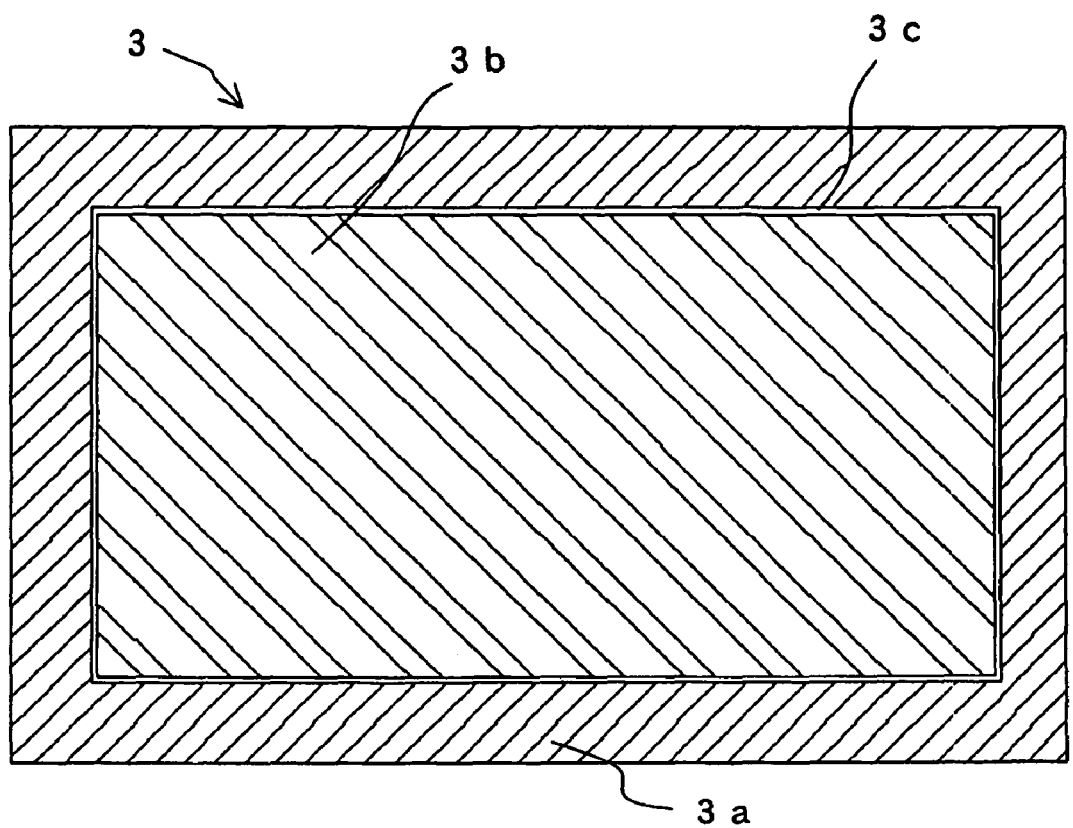
[FIG. 4]
A plan view showing the sealing area and electron beam irradiation area of the laminate film that is shown in FIG. 3.

Laminate films 3 and 4 further include on their outer peripheries sealing areas 3a and 4a, which are the areas that are heat-sealed when hermetically sealing battery element 6, and the area enclosed by sealing areas 3a and 4a are electron beam irradiation areas 3b and 4b, which are the areas irradiated by an electron beam. As a representative example of laminate films 3 and 4, FIG. 4 shows a plan view of one laminate film 3 with sealing area 3a and electron beam irradiation area 3b distinguished by slanting lines. As shown in FIG. 4, electron beam irradiation area 3b extends across substantially the entire area of laminate film 3 that is inside sealing area 3a that runs along the outer periphery of laminate film 3. In the other laminate film 4, electron beam irradiation area 4b similarly extends over substantially the entire area within sealing area 4a.

As laminate films 3 and 4, a film that is typically used in this type of film-covered battery can be used as long as it can seal battery element 6 so as to prevent leakage of electrolyte and has a structure in which a metal foil layer and a heat-seal resin layer are laminated. In addition, a protective film such as nylon or polyester such as polyethylene terephthalate may be laminated on the surface of the metal foil layer that is opposite the heat-seal resin layer.

As the metal foil layer, a foil of, for example, aluminum, titanium, titanium alloy, iron, stainless steel, and magnesium alloy having a thickness of 10 μm-100 μm may be used. As the resin that is used in the heat-seal resin layer, any resin composition can be used that is capable of heat-sealing and further, that allows the formation of cross-linked structures when irradiated by an electron beam. In other words, examples of resins that can be used in the heat-seal resin layer include: a single resin; a mixture of a plurality of resins; or a resin composition that permits the use of an electron beam-degradable resin by adding (including mixture and application; this qualification also applying for later examples) an electron beam-reactive resin compound.

Resins that can be considered as this resin composition include: polyolefin homopolymers such as polyethylene (high-, medium-, or low-density polyethylene or linear low-density polyethylene) and polypropylene; polyolefin copolymers such as propylene-ethylene copolymers or copolymers of propylene and/or ethylene and an α-olefin such as butene-1; and resins containing repeating units of modified polyolefins composed of —($CH_2$—CHX)— (where X is a substituent of, for example, H or $CH_3$), such as ethylene-vinyl acetate copolymer (EVA), ethylene-ethyl acrylate copolymer (EEA), ethylene-methyl acrylate copolymer (EMA), and ethylene-glycidyl methacrylate copolymer (EGMA).

An electron beam-degradable resin such as polyisobutylene, polymethacrylate, and polyvinylidene fluoride can also be used as the heat-seal resin of laminate films 3 and 4 if an electron beam-reactive composition such as shown below is added.

As the electron beam-reactive compound, no particular limitations apply as long as the compound reacts to irradiation by an electron beam, but a polyfunctional compound that can form cross-linked structures is preferable. Examples of compounds that can be used include: a polyfunctional acrylic compound such as triethylene glycol di(meta)acrylate, trimethylolpropane tri(meta)acrylate, pentaerythritol tetra-acrylate, dipentaerythritol hexaacrylate, pentaerythritol triacrylate hexamethylenedi-isocyanate urethane polymer; a monofunctional acrylic compound such as methyl(meta) acrylate or methoxypolyethylene glycol (meta)acrylate; a mixture of a polyfunctional acrylic compound and a monofunctional acrylic compound; a cycloaliphatic epoxy compound such as 3,4-epoxycyclohexylmethyl-3',4'-epoxycyclohexanecarboxylate or 1,4-(6-methyl-3,4-epoxycyclohexylmethylcarboxylate) butane; and a vinyl compound such as vinyl pyrrolidone, vinyl acetate, vinyl pyridine, or styrene. These electron beam-reactive compounds may be mixed with all of the heat-seal resin layer, or may be applied to the surface of the heat-seal resin layer.

Before the process of sealing battery element 6, and more specifically, before the encapsulation of battery element 6 by means of laminate films 3 and 4, the electron beam irradiation of laminate films 3 and 4 is carried out upon laminate films 3 and 4 separately while masking areas other than electron beam irradiation areas 3b and 4b by a material that blocks electron beams. The electron beam therefore irradiates only electron beam irradiation areas 3b and 4b and does not irradiate other areas. The electron beam irradiation of battery element 6 causes some degradation of the electrolyte and can bring about a reduction of battery performance. In the present embodiment, however, laminate films 3 and 4 are subjected to irradiation by an electron beam separately and in isolation, and the battery performance of battery element 6 is therefore not adversely affected.

As the material for blocking the electron beam, any material can be used that can block the electron beam irradiation of electron beam irradiation areas 3b and 4b. Materials that can be considered include metal such as aluminum, iron, lead, titanium, and copper, or a glass material. Of these materials, a metal material such as aluminum or iron is preferable from the standpoint of the ability for processing and forming to a desired shape.

Laminate films 3 and 4 in which electron beam irradiation areas 3b and 4b have been irradiated by an electron beam are next arranged to confront each other such that the heat-seal resin layers are arranged inside and then encapsulated with battery element 6, to which positive electrode lead terminal 5a and negative electrode lead terminal 5b are connected, interposed. Laminate films 3 and 4 are next subjected to heat and pressure at sealing areas 3a and 4a by means of a heat-seal head, whereby battery element 6 is sealed to complete the fabrication of film-covered battery 1. In this sealing, three edges of laminate films 3 and 4 are first heat-sealed to produce a bag form with one open end, electrolyte is injected from the last remaining open side of laminate films 3 and 4 that have assumed this bag form, and the remaining side is then heat-sealed.

As described in the foregoing explanation, the electron beam irradiation of electron beam irradiation areas 3b and 4b of laminate films 3 and 4 causes the heat-seal resin layer to form cross-linked structures in electron beam irradiation areas 3b and 4b. As a result, heat resistance of the heat-seal resin layers of laminate films 3 and 4 is improved in electron beam irradiation areas 3b and 4b. On the other hand, sealing areas 3a and 4a are not irradiated by electron beams and the properties of the heat-seal resin layers in sealing areas 3a and 4a are therefore unaffected. In other words, the heat-seal resin layers are less prone to become soft at high temperatures in electron beam irradiation areas 3b and 4b than in sealing areas 3a and 4a. Here, the lack of a tendency to soften at high temperature means that for this resin, the inclination will be slight in the so-called "creep curve," which is the temperature—strain characteristic when temperature is raised while subjecting the resin to pressure at fixed stress and when temperature is the horizontal axis.

Figure 5:
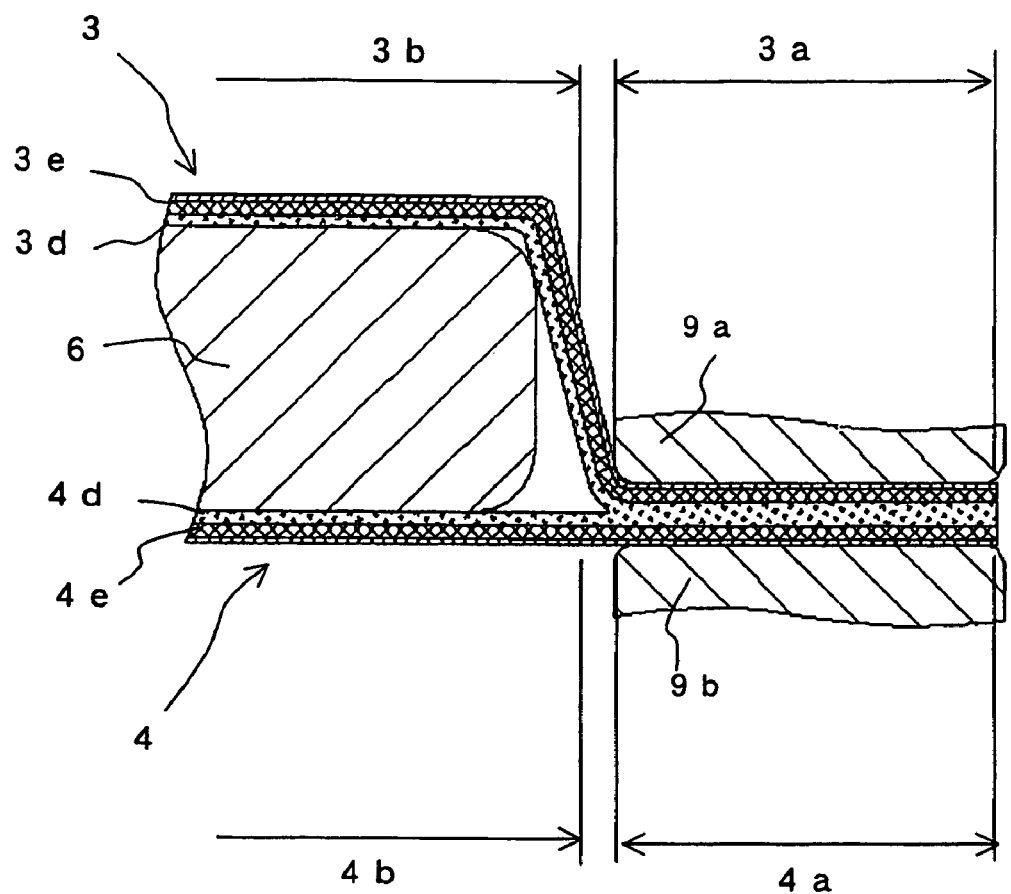
[FIG. 5]
A sectional view of the vicinity of a sealing area of the laminate film at the time of heat-sealing in the film-covered battery that is shown in FIG. 3.

Thus, due to the improvement in heat resistance of electron beam irradiation areas 3b and 4b, when heat-seal heads 9a and 9b are pressed at sealing areas 3a and 4a and laminate films 3 and 4 are heated at the time of heat-sealing of laminate films 3 and 4 as shown in FIG. 5, heat-seal resin layers 3d and 4d fuse and laminate films 3 and 4 are heat-sealed in sealing areas 3a and 4a, but heat-seal resin layers 3d and 4d do not fuse in electron beam irradiation areas 3b and 4b. As a result, metal foil layers 3e and 4e of laminate films 3 and 4 are not exposed even at points of contact with battery element 6, and short-circuits between metal foil layers 3e and 4e and battery element 6 do not occur. Moreover, because sealing areas 3a and 4a are not subjected to electron beam irradiation, cross-linked structures are not formed in heat-seal resin layers 3d and 4d in these areas, and the heat-sealing by heat-seal heads 9a and 9b can therefore be carried out under the same heat-seal conditions as for typical laminate film. Further, the formation of cross-linked structures in heat-seal resin layers 3d and 4d by irradiation by electron beams can also facilitate the selective formation of cross-linked structures in heat-seal resin layers 3d and 4d.

No particular limitations are imposed regarding the amount of electron beam irradiation used for forming cross-linked structures in heat-seal resin layers 3d and 4d, but when an electron beam-reactive compound is not used in heat-seal resin layers 3d and 4d, an excessive amount of electron beam irradiation produces gas and swelling in electron beam irradiation areas 3b and 4b and in some cases results in hardening and degradation. In particular, hardening of electron beam irradiation areas 3b and 4b raises the potential for the occurrence of cracks in heat-seal resin layers 3d and 4d due to, for example, impact from the outside. From the standpoints of the effectiveness of cross-linking and the protection of laminate films 3 and 4, the amount of irradiation by an electron beam is preferably less than 40 Mrad, more preferably less than 30 Mrad, and most preferably 5-20 Mrad.

When heat-seal resin layers 3d and 4d contain an electron beam-reactive compound, however, swelling due to the production of gas and hardening of electron beam irradiation areas 3b and 4b can be suppressed, and the amount of irradiation by electron beam can therefore be increased to a higher level than for cases in which an electron beam-reactive compound is not used. However, increasing the amount of electron beam irradiation also tends to increase the amount of generated heat, and the amount of electron beam irradiation is therefore preferably less than 50 Mrad, more preferably less than 40 Mrad, and most preferably 10-30 Mrad.

Whether heat-seal resin layers 3d and 4d contain or do not contain an electron beam-reactive compound, the electron beam may irradiate either the front surface or rear surface (the rear surface sides being the sides on which heat-seal resin layers 3d and 4d are provided) of laminate films 3 and 4. However, when the electron beam irradiates the rear surface side, the electron beam is not transmitted through metal foil layers 3e and 4e and therefore directly irradiates heat-seal resin layers 3d and 4d. As a result, a lower amount irradiation may be employed than when irradiating from the front surface side.

As previously explained, the electron beam irradiation of laminate films 3 and 4 is carried out upon laminate films 3 and 4 separately before sealing battery element 6, but the electron beam irradiation is preferably carried out after the formation of the depression particularly when a depression is included as in laminate film 3. The reason for this is that, when a depression is formed after irradiation by an electron beam, the processing for forming the depression applies stress to the portion in which the heat-seal resin layer has been irradiated by the electron beam and consequently hardened, whereby cracks occur in the heat-seal resin layer. However, if the degree of processing (the magnitude of the applied stress) is reduced to the extent that cracks do not occur in the heat-seal resin layer due to processing or if the degree of hardening caused by electron beam irradiation is reduced, electron beam irradiation may be carried out before the formation of the depression.

In FIG. 4, unprocessed area 3c in which no processing is carried out is established at the border between sealing area 3a and electron beam irradiation area 3b around the entire perimeter of electron beam irradiation area 3b. The establishment of this unprocessed area 3c is not absolutely necessary, but this unprocessed area 3c can be used as a margin such that electron beam irradiation area 3b and sealing area 3a do not overlap as a result of fabrication error. In addition, unprocessed area 3c can be used as a folding line when the flange (part of sealing area 3a) of film-covered battery 1 (see FIG. 3) is folded to improve the packaging efficiency of film-covered battery 1. This point also holds true for laminate film 4.

Figure 6:
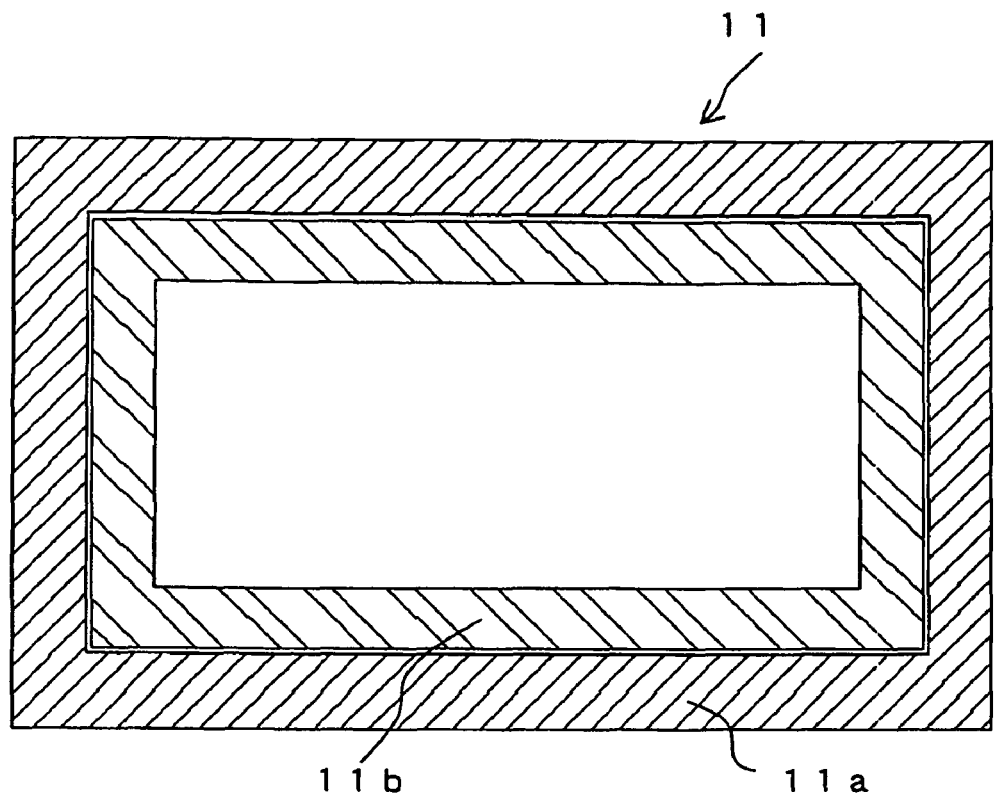
[FIG. 6]
A plan view showing another example of the sealing area and electron beam irradiation area of the laminate film of a film-covered battery according to the present invention.
Figure 7:
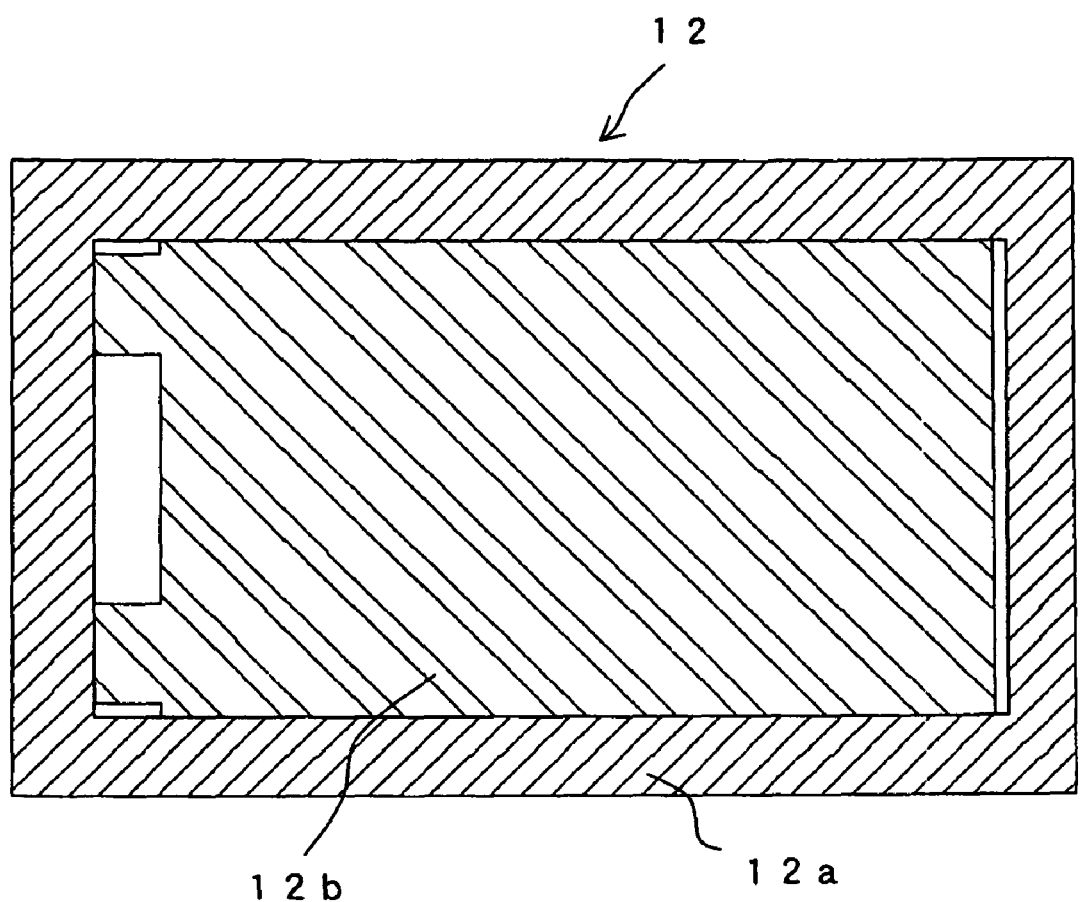
[FIG. 7]
A plan view showing yet another example of the sealing area and electron beam irradiation area of the laminate film in the film-covered battery according to the present invention.

Further, an example was shown in which electron beam irradiation areas 3b and 4b are provided over substantially the entire area enclosed by sealing areas 3a and 4a, respectively, as shown in FIG. 3, but electron beam irradiation areas 3b and 4b, i.e., the areas for forming cross-linked structures, can assume any pattern that includes at least the areas in which laminate film 3 contacts parts that are sealed inside (including not only battery element 6, but also portions of positive electrode lead terminal 5a and negative electrode lead terminal 5b), and moreover, the areas in which the temperature of the heat-seal resin layers of laminate films 3 and 4 during heat-sealing, and particularly the peripheries of sealing areas 3a and 4a, surpasses the melting point of the heat-seal resin layer when in the state in which cross-linked structures are not formed. For example, in the example of laminate film 11 shown in FIG. 6, electron beam irradiation area 11b is formed only in the area within sealing area 11a in which the temperature of heat-seal resin layer during heat-sealing surpasses the melting point for the state of the heat-seal resin layer in which cross-linked structures are not formed. Alternatively, in the example of laminate film 12 that is shown in FIG. 7, electron beam irradiation area 12b is formed only in the area within sealing area 12a in which laminate film 12 contacts parts that are accommodated inside.

Regarding the patterns of electron beam irradiation areas 3b, 11b and 12b, the same or different patterns may be adopted for each of the two laminate films that enclose battery element 6 in the direction of thickness of battery element 6 (see FIG. 3).

The following explanation regards a supplementary means at the time of heat-sealing for more effectively exhibiting the effects obtained by the above-described present invention.

Figure 8:
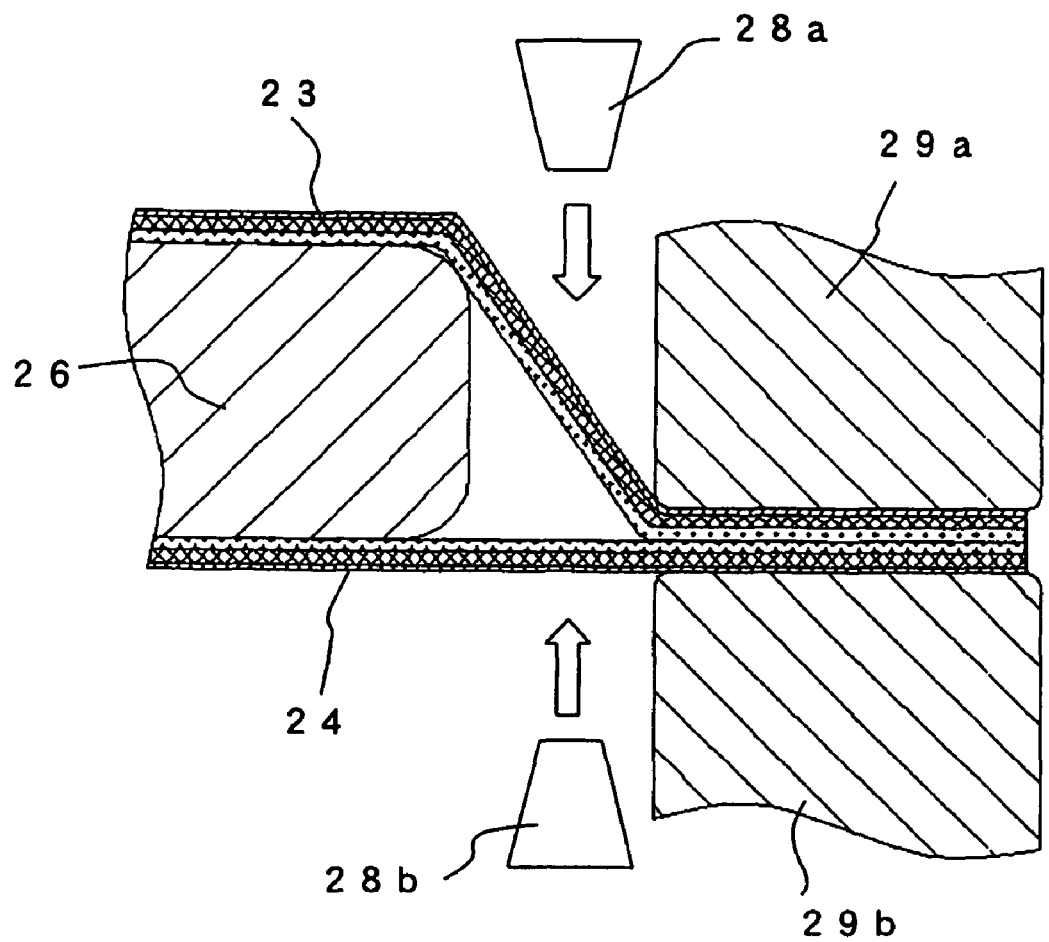
[FIG. 8]
A sectional view of the vicinity of a sealing area at the time of heat sealing for explaining an example of a supplementary means of the present invention.

FIG. 8 is a sectional view of the vicinity of the sealing area at the time of heat-sealing for explaining an example of a supplementary means of the present invention. In the example that is shown in FIG. 8, air nozzles 28a and 28b are arranged in the vicinities of heat-seal heads 29a and 29b, respectively, and air is directed from these air nozzles 28a and 28b toward laminate films 23 and 24. Laminate films 23 and 24 are in this way cooled, whereby, with regard to the prevention of melting of the heat-seal resin layers in areas other than the areas for heat sealing by heat-seal heads 29a and 29b, a multiplication of the effect obtained by forming cross-linked structures can be anticipated. In addition, air that is sprayed from air nozzles 28a and 28b also has the effect of suppressing the radiation of heat toward battery element 26 from heat-seal heads 29a and 29b.

To effectively implement cooling by air, air nozzles 28a and 28b are preferably arranged so as to direct air to the areas of laminate films 23 and 24 that are between heat-seal heads 29a and 29b and the points of contact with battery element 26. This arrangement of air nozzles 28a and 28b enables cooling of the heat that is conveyed from heat-seal heads 29a and 29b to laminate films 23 and 24 before the heat arrives at points of contact with battery element 26.

FIG. 8 shows an example in which two air nozzles 28a and 28b are provided to correspond to each of laminate films 23 and 24, but air nozzles may also be provided on only one side of laminate films 23 and 24 depending on the ease of heat transmission.

Figure 9:
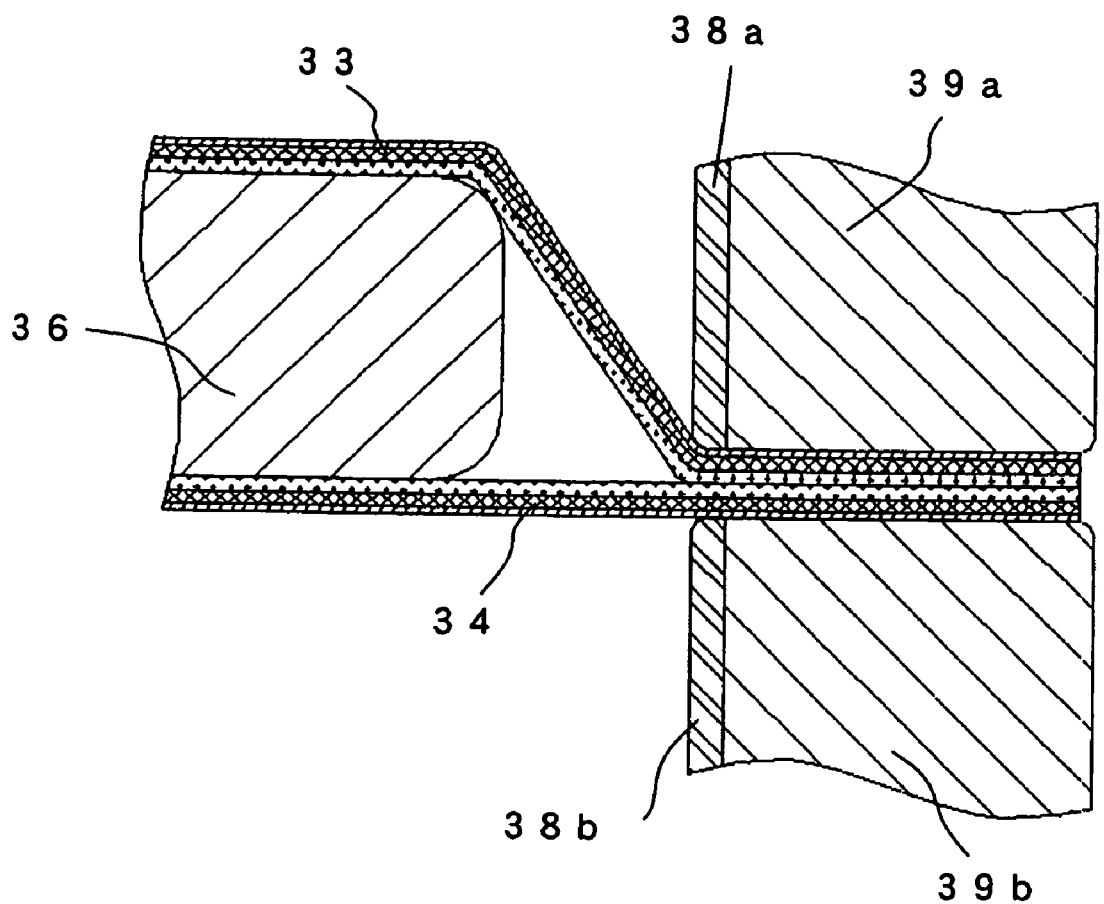
[FIG. 9]
A sectional view in the vicinity of a sealing area at the time of heat-sealing for explaining another example of a supplementary means of the present invention.

FIG. 9 is a sectional view of the vicinities of heat-sealing areas at the time of heat-sealing for explaining another example of a supplementary means of the present invention. In the example that is shown in FIG. 9, the supplementary means is of a configuration in which heat-insulating plates 38a and 38b composed of a material having lower thermal conductivity than heat-seal heads 39a and 39b are attached to the battery element 36-side end surfaces of each of heat-seal heads 39a and 39b, respectively, and are arranged such that pressure is applied against laminate films 33 and 34 by heat-seal heads 39a and 39b and heat-insulating plates 38a and 38b. A ceramic or a heat-resistant resin can be used as heat-insulating plates 38a and 38b. In addition, when heat-seal heads 39a and 39b are composed of aluminum, iron or stainless steel can be used as heat-insulating plates 38a and 38b.

The provision of heat-insulating plates 38a and 38b on heat-seal heads 39a and 39b, respectively, enables a suppression of the transmission of heat toward battery element 36 by way of laminate films 33 and 34 and the radiation of heat from heat-seal heads 39a and 39b toward battery element 36. Accordingly, regarding the prevention of the melting of heat-seal resin layers in areas other than the areas that are to be heat-sealed by heat-seal heads 39a and 39b, a multiplication of the effect that is obtained by forming cross-linked structures in laminate films 33 and 34 can be anticipated.

In addition, heat-insulating plates 38a and 38b apply pressure to laminate films 33 and 34, and by appropriately setting the thickness of heat-insulating plates 38a and 38b, the effect of heat transfer from heat-seal heads 39a and 39b can melt the heat-seal resin and realize heat sealing even at points of laminate films 33 and 34 at which pressure is applied by heat-insulating plates 38a and 38b.

Figure 10:
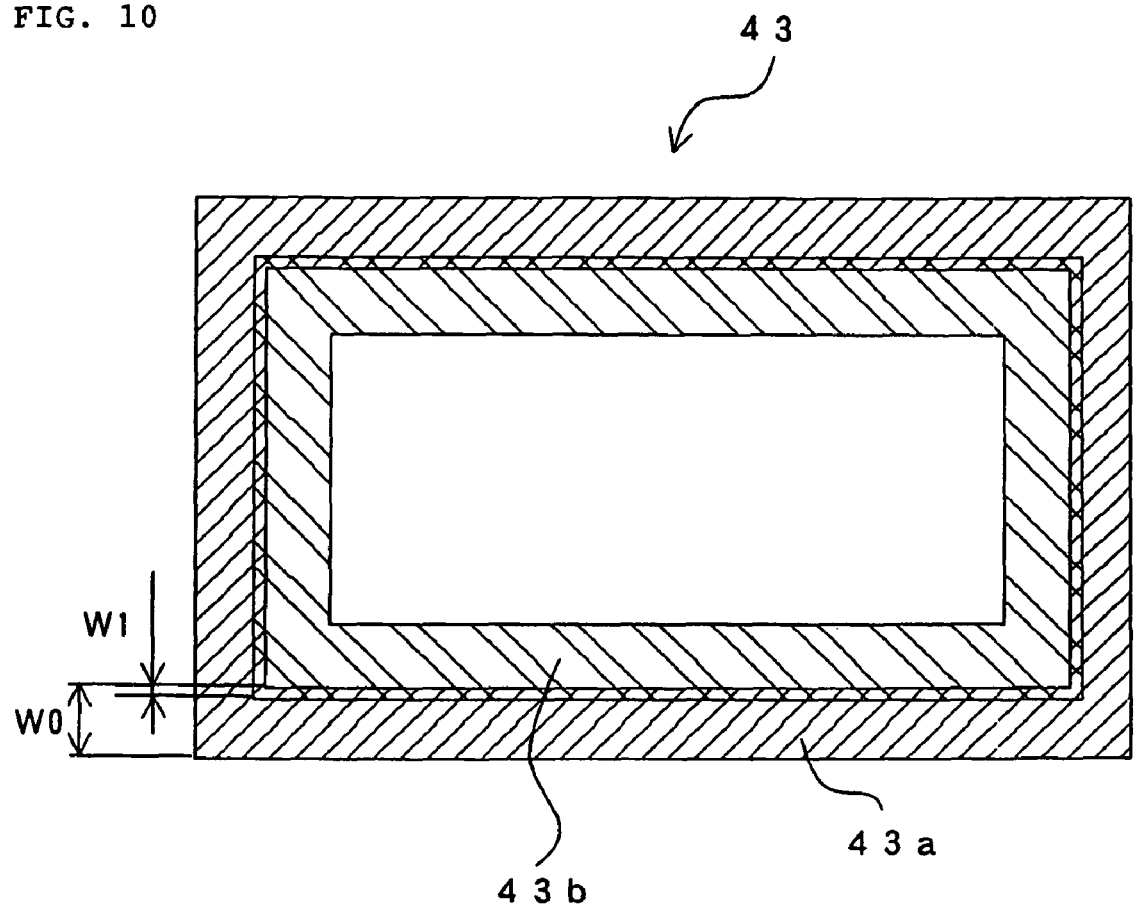
[FIG. 10]
A plan view showing an example that differs from FIGS. 4, 6, and 7 of the sealing area and electron beam irradiation area of the laminate film of the film-covered battery according to the present invention.

In the above-described example, a case was shown in which electron beam irradiation areas were formed so as to not overlap with heat-seal areas, but electron beam irradiation area 43b is preferably formed on the inner edge of heat-seal area 43a within a range that does not affect the heat-sealing properties of laminate film 43, as shown in FIG. 10. In other words, in the example that is shown in FIG. 10, electron beam irradiation area 43b is formed in, of the areas in which the heat-seal resin layer reaches its melting point at the time of heat sealing of laminate film 43, areas other than the outer edge of the heat-sealing area of laminate film 43.

Of the non-sealing area that is enclosed within sealing area 43a, the area that reaches the highest temperature at the time of heat-sealing of laminate film 43 is the portion that borders sealing area 43a. However, this portion is also the portion that is pressed by the edges of the heat-seal heads, and at the time of heat-sealing, is the part of the non-sealing area in which the heat-seal resin layer is most prone to melting and that is most subject to decrease in thickness. Electrolyte contacts the portion of the non-sealing areas that borders sealing area 43a, and accordingly, should melting of the heat-seal resin layer in this border area cause the metal foil layer of laminate film 43 to contact the electrolyte, the metal foil layer will short-circuit with the battery element by way of the electrolyte.

However, forming electron beam irradiation area 43b on the inner perimeter of sealing area 43a within a range that does not affect the heat-sealing properties of laminate film 43 as described above serves to suppress melting of the heat-seal resin layer in the portion of the non-sealing area that is subject to the highest temperatures. This measure can therefore more effectively prevent short-circuits between the metal foil layer and the battery element caused by melting of the heat-seal resin layer at the time of heat sealing.

Figure 11:
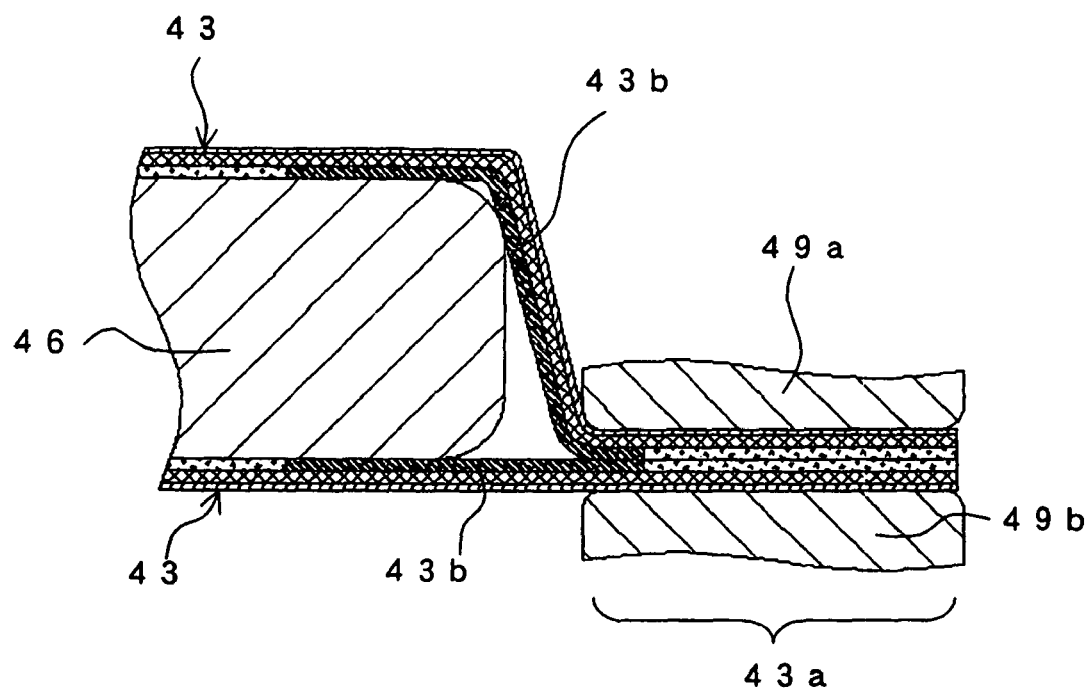
[FIG. 11]
A sectional view of the vicinity of the sealing area at the time of heat-sealing that uses the laminate film shown in FIG. 10.

When laminate film 43 that is shown in FIG. 10 is used to fabricate a film-covered battery, heat-seal heads 49a and 49b apply pressure and heat to the periphery of confronting laminate films 43 with battery element 46 interposed, as shown in FIG. 11. At this time, heat-seal heads 49a and 49b apply heat and pressure to the area of laminate films 43 that includes the outer periphery of electron beam irradiation area 43b. Although the heat-seal strength of electron beam irradiation area 43b in the area that is pressed and heated by heat-seal heads 49a and 49b is weaker than in other areas (areas in which cross-linked structures are not formed), the laminate films are heat-sealed together with the result that the area that is subjected to heat and pressure by heat-seal heads 49a and 49b becomes sealing area 43a. In other words, electron beam irradiation area 43b is formed in an area that includes the inner perimeter of sealing area 43a. In the portion of non-sealing area that borders sealing area 43a, virtually no melting occurs in the heat-seal resin layer of laminate film 43, and as a result, short-circuits between the metal foil layer and battery element 46 by way of the electrolyte can be more effectively prevented.

In this example, forming electron beam irradiation area 43b within a range that does not affect the heat-sealing properties of laminate film 43 is crucial. The heat-sealing properties of laminate film 43 are dependent on the width W1 of electron beam irradiation area 43b with respect to the width W0 of sealing area 43a in the direction that is at a right angle to the longitudinal direction of sealing area 43a, as shown in FIG. 10. An excessive W1/W0 raises the concern that adequate heat-sealing of laminate film 43 cannot be realized. To adequately realize heat-sealing of laminate film 43, W1 is preferably no greater than ½ W0, more preferably no greater than ⅓ W0, and most preferably no greater than ¼ W0.

A number of representative examples of the present invention have been described in the foregoing explanation, but the present invention is not limited to any of these examples and is obviously open to appropriate modification within the scope of the technical gist of the present invention.

For example, in the above-described examples, a battery element was interposed between two laminate films arranged on the two sides of the battery element in its direction of thickness, following which the four surrounding sides were heat-sealed, but the battery element may also be sealed by folding a single laminate film in half, interposing the battery element, and then heat-sealing the three open sides. In this case, the electron beam irradiation for forming cross-linked structures in the heat-seal resin may be carried out before or after folding the laminate film in half when the electron beam irradiation area is the same pattern on the upper surface side and lower surface side, but when the patterns on the two sides differ, the electron beam irradiation is preferably carried out before folding the laminate film in half.

In addition, if the battery element is a construction that includes positive electrodes, negative electrodes, and an electrolyte, any battery element normally used in batteries can be applied. The battery element in a typical lithium-ion secondary battery is formed by: alternately placing positive electrode plates, in which a positive electrode active material such as lithium—manganese oxide or lithium cobalt oxide is applied to both surfaces of, for example, aluminum foil, in confrontation with negative electrode plates, in which a carbon material that permits doping/dedoping of lithium is applied to both surfaces of, for example, copper foil; providing separators interposed between the plates; and then impregnating with an electrolyte that contains lithium salt. Alternatively, the present invention further allows application to battery elements of other types of chemical batteries such as nickel/hydrogen batteries, nickel/cadmium batteries, lithium-metal primary batteries or secondary batteries, lithium polymer batteries, and further allows application to capacitor elements.

Regarding the configuration of the battery element, although a laminated form in which a plurality of positive electrode plates and negative electrode plates are alternately stacked was described in the above-described examples, the present invention further allows a coiled battery element in which: positive electrode plates, negative electrode plates, and separators are formed as strips; the positive electrode plates and negative electrode plates are stacked together with the separators interposed; and the components then rolled and compressed to a flat form to alternately arrange the positive electrodes and negative electrodes.

Finally, although an example was shown in FIG. 3 in which positive electrode lead terminal 5a and negative electrode lead terminal 5b extended from the same side of film-covered battery 1 these lead terminals may each extend from different sides, and may, for example, extend from opposite sides of film-covered battery 1.

The invention claimed is:

1. A film-covered battery comprising:
   a pair of laminate films, each of which includes at least a heat-seal resin layer and a metal foil layer;
   a battery element enclosed between the pair of laminate films;
   the laminate films each including a first area at an outer periphery of the laminate film and where the laminate film extends beyond the battery element, the first areas being heat-sealable to one another;
   the laminate films each including a second area inside the first area and in which the laminate film contacts the battery element;
   wherein the heat-sealed resin layer includes a cross-linked structure formed only in the second area, and formed at least in an area where said laminate film contacts the battery element that is sealed inside said laminate film.

2. A film-covered battery according to claim 1, wherein said first area is formed in an area that includes an outer periphery of the second area in which said cross-linked structure is formed.

3. A film-covered battery according to claim 1, wherein:
   the battery element includes a positive electrode and a negative electrode that confronts the positive electrode;
   lead terminals that extend outside said laminate films are connected to each of said positive electrode and negative electrode; and
   said battery element and portions of said lead terminals are sealed inside the pair of laminate films.

4. A film-covered battery according to claim 1, wherein said cross-linked structure is formed by irradiating said laminate film by an electron beam.

5. A film-covered battery according to claim 4, wherein at least the second area of said heat-seal resin layer includes a polyolefin.

6. A film-covered battery according to claim 4, wherein at least the second area of said heat-seal resin layer is a material including an electron beam-reactive compound and an electron beam-degradable resin.

7. A film-covered battery according to claim 1, wherein said battery element is a chemical battery element or a capacitor element.

8. A fabrication method of a film-covered battery in which a battery element having a configuration in which a positive electrode confront a negative electrode is encapsulated in a laminate film in which at least a heat-seal resin layer and a metal foil layer are laminated and sealed by heat-sealing a periphery of said laminate film, said fabrication method comprising the steps of:
   forming a cross-linked structure in said heat-seal resin layer in at least an area of said laminate film in which said heat-seal resin layer reaches a temperature equal to or greater than the melting point at the time of heat-sealing said laminate film and only in an area that is disposed inside an outer periphery of the heat sealed area, and at least in an area in which said laminate film contacts a part that is sealed;
   encapsulating said battery element in said laminate film in which the cross-linked structure have been formed in said heat-seal resin layer with said heat-seal resin layer as an inner surface; and
   heat-sealing the outer periphery of said laminate film that encapsulates said battery element to seal said battery element.

9. A fabrication method of a film-covered battery according to claim 8, wherein the step for heat sealing the outer periphery of said laminate film includes heat-sealing an area that includes an outer periphery of an area in which said cross-linked structure has been formed.

10. A fabrication method of a film-covered battery according to claim 8, wherein said step of forming cross-linked structure includes the steps of:
    masking an area of said laminate film in which the cross-linked structure is not formed; and
    irradiating said laminate film that has been masked by an electron beam.

11. A fabrication method of a film-covered battery according to claim 10, further including a step of forming in said laminate film a depression for accommodating said battery element before said step of forming the cross-linked structure.

12. A film-covered battery according to claim 1, wherein the cross-linked structure is not formed in the first areas of each of the laminate films.

13. A film-covered battery according to claim 1, wherein the second area of each of the laminate films is substantially an entire area surrounded by the first area of each of the laminate films.

14. A film-covered battery according to claim 5, wherein at least the second area of the heat-seal resin layer is made of one of the group consisting of: a polyolefin homopolymer, a polyolefin copolymer, and a resin comprising repeating groups of —($CH_2$—CHX)—.

15. A film covered-battery according to claim 1, wherein the heat-seal resin layer of each of the laminate films is made of a resin capable of heat-sealing and allowing the formation of cross-linked structures when irradiated by an electron beam.

16. A film-covered battery obtained by:
forming a pair of laminate films each having a heat-seal resin layer and a metal foil layer, wherein the heat-seal resin layer forms cross-linked structures when exposed to electron beam radiation;
irradiating an exposed area of at least one of the laminate films, the exposed area disposed inside a heat-seal area to form cross-linked structures only within the exposed area and formed at least in an area where the battery contacts the laminate film, the heat sealed area being disposed at an outer periphery of the laminate film;
placing a battery element between the pair of laminate films; and
applying heat and pressure to the heat-seal area to seal the battery within the pair of laminate films.

* * * * *